United States Patent
Jallot

(12) 
(10) Patent No.: US 6,176,448 B1
(45) Date of Patent: Jan. 23, 2001

(54) SEAT BELT RETRACTOR

(75) Inventor: Frederic Jallot, Carlisle (GB)

(73) Assignee: Breed Automotive Technology, Inc., Lakeland, FL (US)

(*) Notice: Under 35 U.S.C. 154(b), the term of this patent shall be extended for 0 days.

(21) Appl. No.: 09/368,338

(22) Filed: Aug. 3, 1999

(30) Foreign Application Priority Data

Dec. 21, 1998 (GB) .................................................. 9828207

(51) Int. Cl.7 .................................................. B65H 75/48
(52) U.S. Cl. ........................ 242/379; 242/382; 242/383.4
(58) Field of Search ................... 242/376, 379, 242/379.1, 382–384.7; 280/806; 297/478

(56) References Cited

U.S. PATENT DOCUMENTS

| | | | |
|---|---|---|---|
| 4,136,841 | 1/1979 | Fohl | 242/376 |
| 4,767,078 | 8/1988 | Fohl | 242/383 |
| 5,161,748 | 11/1992 | Iguchi et al. | 242/376 |

FOREIGN PATENT DOCUMENTS 1561639  of 1980  (GB) .

*Primary Examiner*—John M. Jillions
(74) *Attorney, Agent, or Firm*—L. Drayer

(57) ABSTRACT

A seat belt retractor has a lock cup mounted for pivotal or rotational movement in relation to a bush mechanism over a predetermined arc of a circle. The arc subtends an active working section of less than 360°. A wedge extends into the gap between the lock cup and the bush mechanism to reduce the gap when the retractor is at rest. Preferably a wedge extends from both the lock cup and the bush mechanism. Such an arrangement reduces the slack between the lock cup and bush mechanism without jamming the mechanism.

5 Claims, 4 Drawing Sheets

SEAT BELT RETRACTOR

FIELD OF THE INVENTION

The present invention relates to a seat belt retractor and particularly to an arrangement for reducing noise and increasing working tolerances in seat belt retractors.

BACKGROUND OF THE INVENTION

A seat belt retractor has many rotating and pivoting parts such as locking elements, arms that drive the locking elements and pawls that transmit acceleration sensor information to the locking elements. These parts must be able to rotate or pivot freely in their mountings, with minimum friction, for optimum performance and response. However if clearances between components are made too large unsatisfactory noise levels, through rattle, may result and the extra movement may also affect the overall performance of the retractor.

SUMMARY OF THE INVENTION

According to the present invention there is provided a retractor for a seat belt comprising a movable member mounted for pivotal or rotational movement, in relation to another member, over a predetermined arc of a circle, the arc subtending active working section of less than 360°, wherein a wedge shaped portion extends into the gap between the movable part and the other part to reduce the gap when the retractor is at rest.

Preferably a wedge extends from both members. Such an arrangement reduces the slack between the two members without jamming the mechanism.

This arrangement is particularly appropriate between a retractor lockup and its corresponding mechanism bushing. The wedges on each member touch each other in the rest position and thus inhibit movement and reduce noise. However, in the working position of the lock cup and bush, the wedges are spaced apart and do not interfere with the normal working of the members since the clearance is restored.

Such an arrangement allows for larger tolerances to be compensated, than were hitherto normally allowed. Therefore the cost of the retractor is reduced without compromising the performance of the retractor, and noise due to relative movement of components is reduced. More consistent performance is achieved.

BRIEF DESCRIPTION OF THE DRAWINGS

For a better understanding of the present invention and to show how the same has been carried into effect, reference will now be made to the accompanying drawings in which.

DETAILED DESCRIPTION OF THE INVENTION

Figure 1:
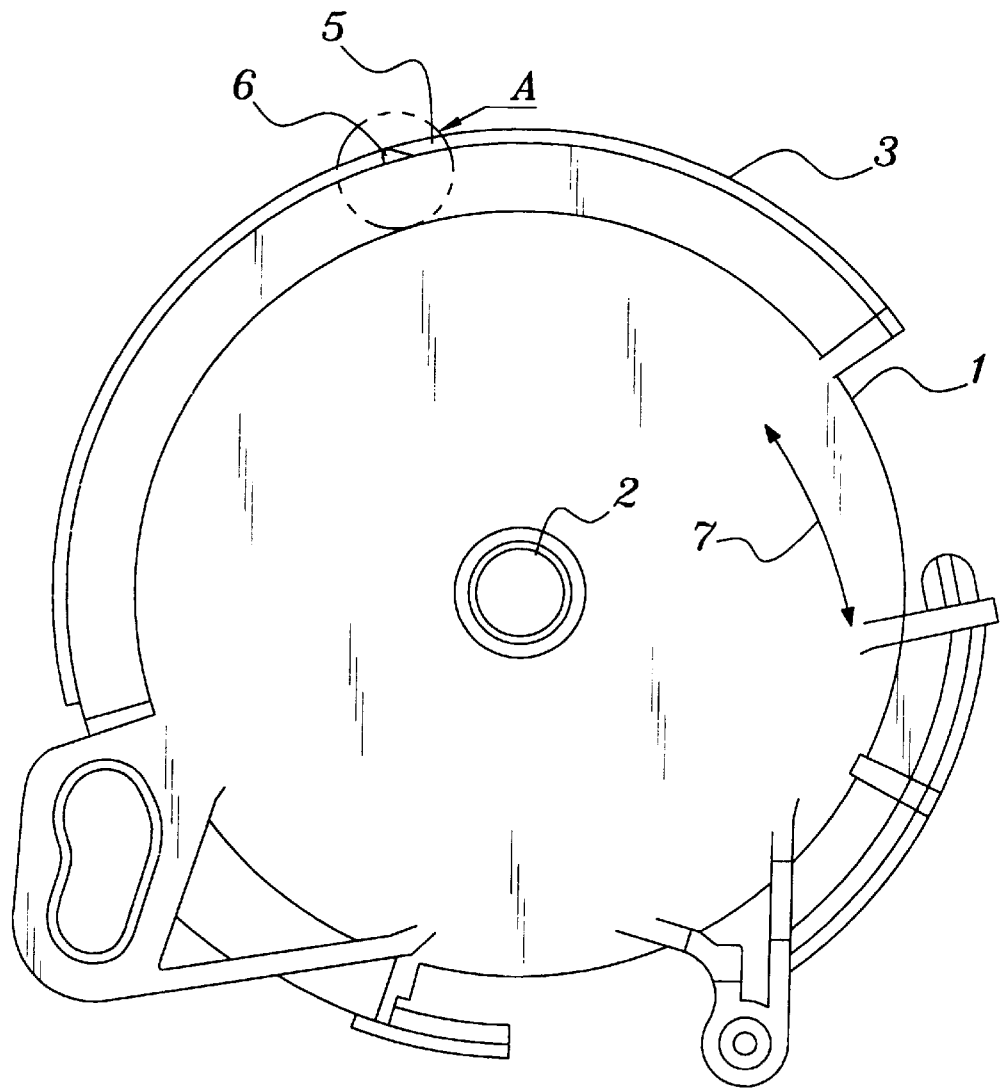
FIG. 1 is a cross-sectional view through a seat belt retractor lock cup illustrating one embodiment of the invention.

FIG. 1 shows a retractor lock cup 1 that is rotatable about pivot 2 within a mechanism bush 3. A small clearance gap exists between the outer circumference of the lock cup 1 and the inside circumference of the bush 3. Extending into the gap are wedges 5, 6. One wedge 5 extends from the bush 3 radially inwardly towards the pivot, the second 6 extends radially outwardly. They are positioned so that they interact by sliding towards each other in the rest position of the retractor lock cup 1, taking up the clearance gap and inhibiting rattle of the parts. However, in the working position of the retractor, the gap is restored.

The lock cup 1 only moves through a small arc of a circle in normal use and this is indicated at 7. When the lock cup 1 is in its maximum clockwise position (as illustrated), this represents the rest position (retractor unlocked and webbing free to pay out). In this position the wedges 5 and 6 abut each other, closing the clearance gap and preventing movement of the lock cup relative to the bushing 3. Under the influence of a retractor locking signal (for example from a vehicle acceleration/deceleration sensor, not shown) the lock cup moves in an anti-clockwise direction through the arc indicated at 7 until the retractor is locked against further seat belt webbing pay-out. In this maximum anti-clockwise position, the wedges 5 and 6 are spaced apart and do not interact. Thus the clearance gap is maintained and the maximum advantages with regard to friction and performance are retained. At no time in the working or rest circles, are the wedges expected to ride over each other and thus there should be no jamming.

Figure 2:
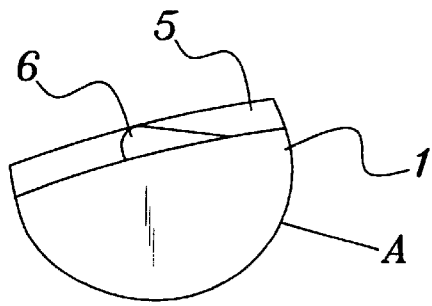
FIG. 2 is an enlarged view of the part of FIG. 1 indicated by circle A.

FIG. 2 indicates in close-up view the section labeled A in FIG. 1. Like parts are indicated by like reference numerals. This shows in more detail the arrangement of the wedges that, as illustrated, have parallel flat sides facing each other that are set at an acute angle to the circumference of the lock cup.

Figure 3:
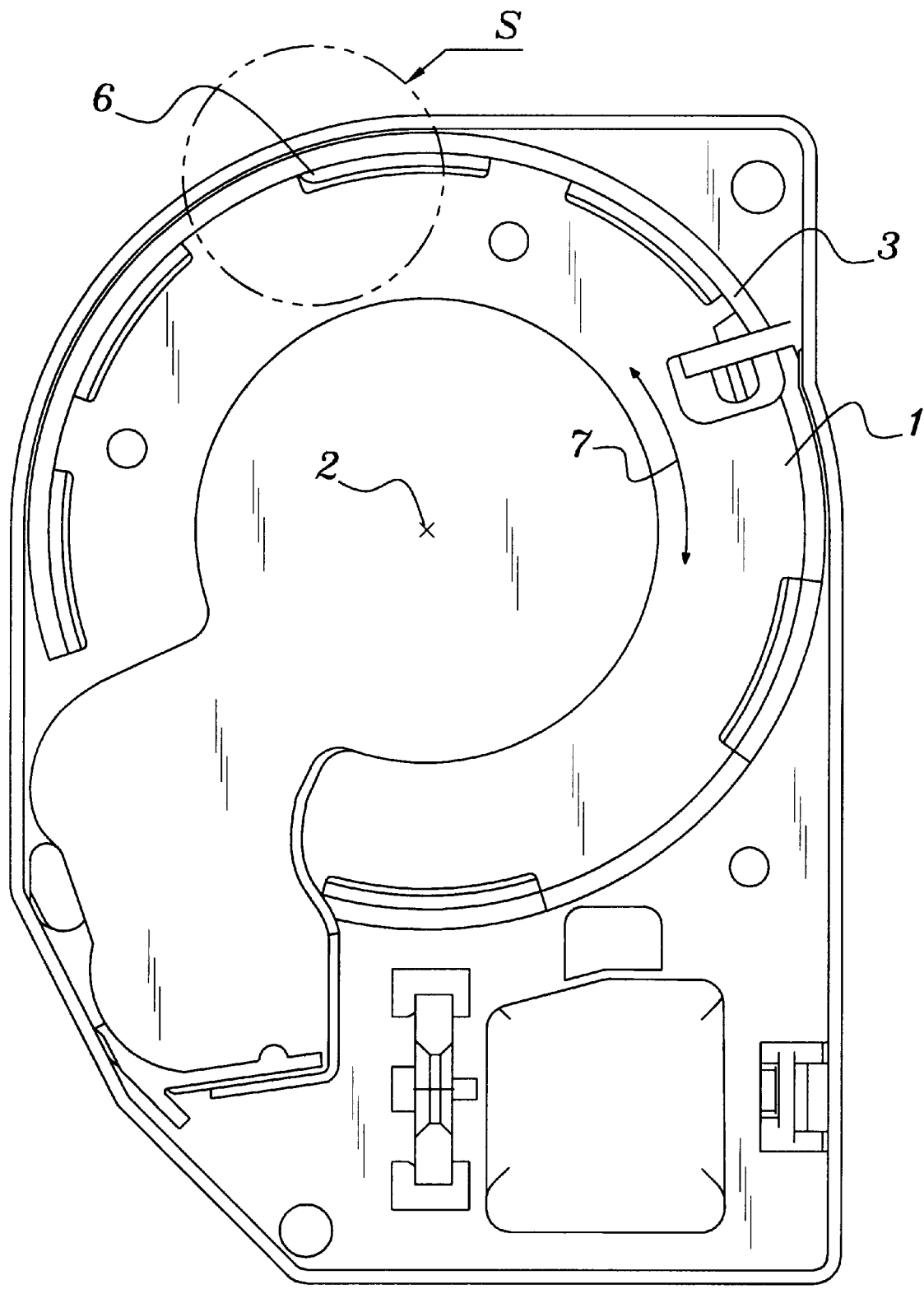
FIG. 3 is a cross-sectional view of a seat belt retractor lock cup illustrating a second embodiment of the invention.

FIG. 3 shows a second embodiment of the invention. The lock cup 1 pivots about its center 2 within a bushing 3. A wedge 6 extends into the clearance gap to reduce noise levels.

Figure 4:
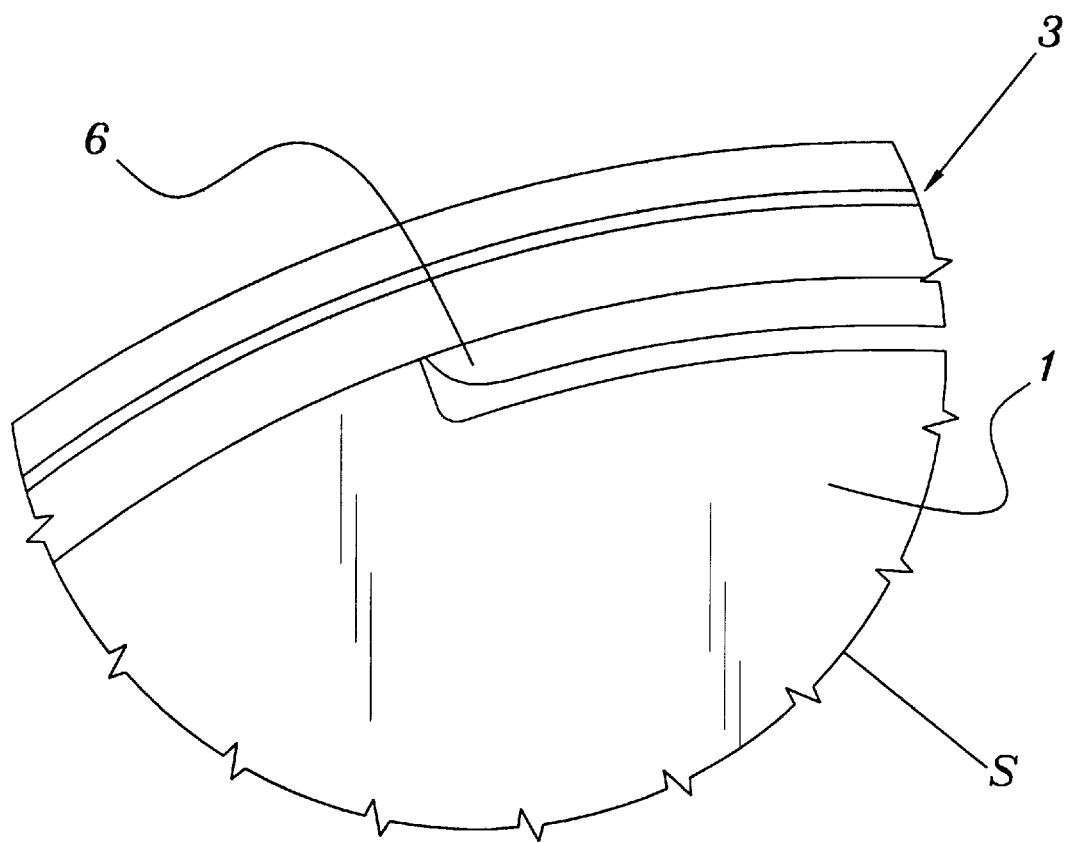
FIG. 4 is an enlarged view of part of FIG. 3 indicated by circle S.

The wedge is shown in more detail in FIG. 4.

Figure 5A:
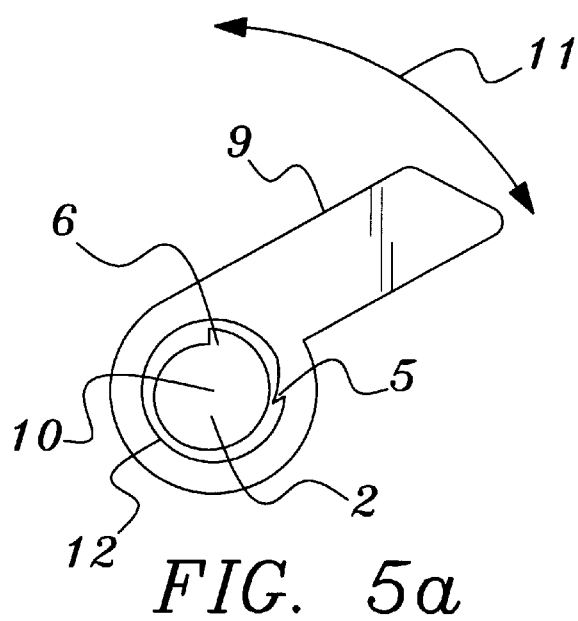
FIGS. 5a and 5b are cross-sectional views of a vehicle sensor pawl, in the rest and working positions respectfully, illustrating a third embodiment of the invention.
Figure 5B:
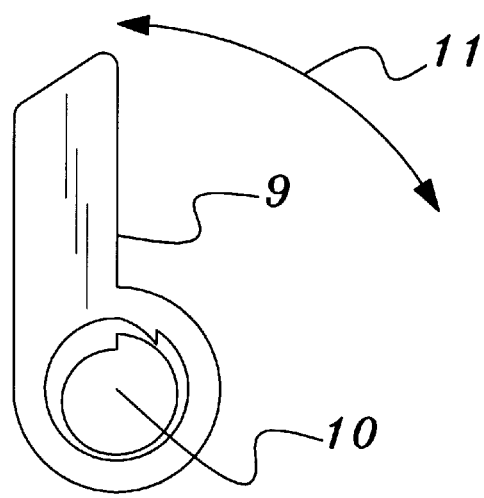

FIGS. 5a and 5b illustrate how the invention can be applied to a vehicle sensor pawl in a seat belt retractor. A vehicle sensor detects a sudden acceleration or deceleration indicative of a crash. Usually an inertia member such as a low friction pawl is seated in a hollow saucer. Under conditions of sudden acceleration or deceleration, the pawl moves relative to the cup and rides up the side. Movement of the pawl pivots a pawl into a retractor locking position.

FIGS. 5a and 5b show such a pawl 9 in the disengaged (FIG. 5a) and the engaged (FIG. 5b) positions respectively. The pawl pivots about its center 10 through an arc indicated at 11. A clearance gap exists between the outside of the pivot rod 2 and the inside of the pawl mounting area 12. A first wedge 5 extends from this in a surface towards the pivot point. A second wedge extends from the pivot rod 2 outwardly.

FIG. 5b shows the vehicle sensor pawl in the locking position in which the wedges 5 and 6 are disengaged.

Figure 6:
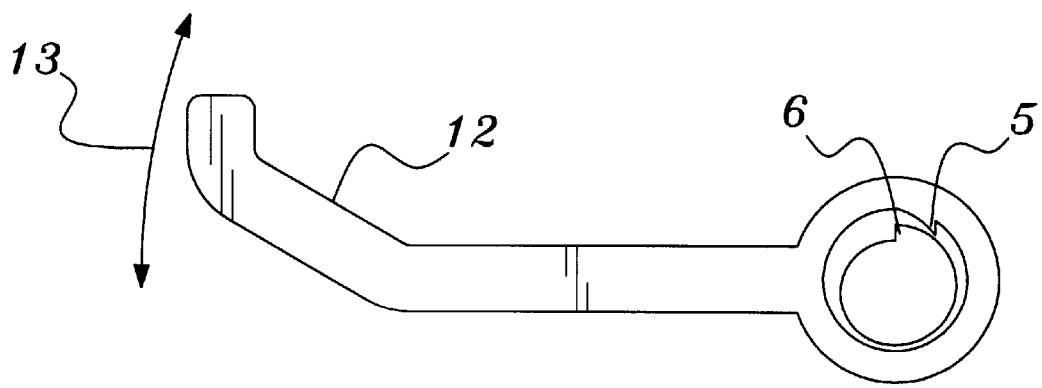
FIG. 6 is a cross-sectional view of a retractor locking pawl illustrating a fourth embodiment of the invention.

FIG. 6 illustrates a further embodiment of the invention as applied to a retractor locking pawl 12. This is shown in the rest position with wedges 5 and 6 engaged to take up the clearance gap. When the retractor is caused to be locked, the locking pawl 12 is rotated in a clockwise direction through an arc indicated at 13 to engage with a ratchet wheel attached to the retractor spool so as to lock the spool against further payout of seat belt webbing. In the locking position, at the extreme clockwise end of the arc 13, the wedges 5, 6 are spaced apart and thus the clearance gap is maintained providing adequate working space for optimum performance.

A person skilled in the art will see that this invention has many applications. It provides a cost-effective way of reducing noise levels in parts that are mutually rotatable. In one particular example in a retractor the noise level was reduced by a factor of 3.

Many changes and modifications in the above described embodiments of the invention can, of course, be carried out without departing from the spirit and scope thereof. Accordingly, that scope is intended to be limited only by the scope of the appended claims.

I claim:

1. A seat belt retractor comprising a movable member mounted for pivotal or rotational movement, in relation to another member, over a predetermined arc of a circle, the arc subtending an active working section of less than 360°, wherein a wedge extends into the gap between the movable member and the other member to reduce the gap when the retractor is at rest.

2. The seat belt retractor of claim 1 wherein the wedge is located on a retractor lock cup, said wedge reducing the gap between said lock cup and a mechanism bush to limit said parts movement.

3. The seat belt retractor of claim 1 wherein the wedge is located on a mechanism bush, said wedge reducing the gap between said mechanism bush and a lock cup to limit said parts movement.

4. The seat belt retractor of claim 1 wherein wedges are located on both a lock cup and a mechanism bush, said wedges reducing the gap between said lock cup and mechanism bush to limit said parts movement.

5. The seat belt retractor of claim 1 further comprising a locking pawl to prevent rotation of the retractor webbing spool, said locking pawl positioned on and pivoting around a pin on which the first wedge is located, said first wedge engages with a second wedge located on the corresponding inner surface wall of the locking pawl to limit said parts movement against each other.

* * * * *